United States Patent
Ohashi et al.

(10) Patent No.: US 11,372,847 B2
(45) Date of Patent: Jun. 28, 2022

(54) BLOCK VERIFICATION DEVICE, BLOCK VERIFICATION METHOD, AND PROGRAM

(71) Applicant: Nippon Telegraph and Telephone Corporation, Tokyo (JP)

(72) Inventors: Shigenori Ohashi, Yokosuka (JP); Hiroki Watanabe, Yokosuka (JP); Shigeru Fujimura, Yokosuka (JP); Atsushi Nakadaira, Yokosuka (JP); Tatsuro Ishida, Yokosuka (JP)

(73) Assignee: Nippon Telegraph and Telephone Corporatioin, Tokyo (JP)

( * ) Notice: Subject to any disclaimer, the term of this patent is extended or adjusted under 35 U.S.C. 154(b) by 233 days.

(21) Appl. No.: 16/957,802

(22) PCT Filed: Jan. 18, 2019

(86) PCT No.: PCT/JP2019/001370
§ 371 (c)(1),
(2) Date: Jun. 25, 2020

(87) PCT Pub. No.: WO2019/142884
PCT Pub. Date: Jul. 25, 2019

(65) Prior Publication Data
US 2020/0401577 A1    Dec. 24, 2020

(30) Foreign Application Priority Data
Jan. 19, 2018 (JP) .............................. JP2018-007601

(51) Int. Cl.
*G06F 16/23*    (2019.01)
*G06F 21/64*    (2013.01)
*H04L 9/06*     (2006.01)

(52) U.S. Cl.
CPC .......... *G06F 16/2379* (2019.01); *G06F 21/64* (2013.01); *H04L 9/0637* (2013.01); *H04L 2209/38* (2013.01); *H04L 2209/56* (2013.01)

(58) Field of Classification Search
CPC ... G06F 16/2379; G06F 21/64; H04L 9/0637; H04L 2209/38; H04L 2209/56
See application file for complete search history.

(56) References Cited

U.S. PATENT DOCUMENTS

2017/0289111 A1* 10/2017 Voell .................... H04L 9/3239
2019/0334725 A1* 10/2019 Zhuang .................. H04L 9/008
(Continued)

FOREIGN PATENT DOCUMENTS

JP    6199518 B1    9/2017

OTHER PUBLICATIONS

Nakamoto, "Bitcoin: A Peer-to-Peer Electronic Cash System", <URL: https://Bitcoin.org/Bitcoin.pdf>, Admitted Prior Art.
(Continued)

*Primary Examiner* — Hares Jami
(74) *Attorney, Agent, or Firm* — Kilpatrick Townsend & Stockton LLP

(57) ABSTRACT

A consensus is formed for a private database shared within a group. A block verification device includes: a private database shared within a group; a communication unit receiving a list of transactions from an overall leader device; a transaction processing unit executing the transactions identified based on the list and outputting the execution results; and a block processing unit generating a proposal including a list, a digest of the private database after execution of the transactions, and a private dataset included in the transactions. The communication unit transmits the proposal to another block verification device belonging to the same group, and transmits the list, the digest of the (Continued)

private database, and the digest of the private dataset to all the other block verification devices when it is determined that a consensus for the proposal is formed.

6 Claims, 11 Drawing Sheets

(56) References Cited

U.S. PATENT DOCUMENTS

| | | | |
|---|---|---|---|
| 2019/0349733 A1* | 11/2019 | Nolan | H04L 67/12 |
| 2019/0354977 A1* | 11/2019 | Tang | H04L 63/12 |
| 2020/0229941 A1* | 7/2020 | Kaddoura | H04L 69/329 |

OTHER PUBLICATIONS

Castro et al., "Practical Byzantine Fault Tolerance", Appears in the Proceedings of the Third Symposium on Operating Systems Design and Implementation, New Orleans, USA, Feb. 1999.
Buterin, "A Next-Generation Smart Contract and Decentralized Application Platform", Ethereum White Paper, Admitted Prior Art.
https://github.com/jpmorganchase/Quorum-docs/blob/master/Quorum%20Whitepaper%20v0.1.pdf, Quorum White Paper, Admitted Prior Art.
International Search Report and Written Opinion, PCT Patent Application No. PCT/JP2019/001370, dated Apr. 16, 2019.
Written Opinion, PCT Patent Application No. PCT/JP2019/001370, dated Apr. 16, 2019.

* cited by examiner

BLOCK VERIFICATION DEVICE, BLOCK VERIFICATION METHOD, AND PROGRAM

TECHNICAL FIELD

The present invention relates to a block verification device, a block verification method, and a program.

BACKGROUND ART

Bitcoin is a first cryptocurrency, which was implemented by way of a ledger stored in a completely distributed-type computer (see Non-patent document 1). Before the advent of Bitcoin, the ledger was needed to be managed by a reliable third person to secure the reliability. A technique called blockchain has been used to secure the reliability of the ledger of Bitcoin.

Blockchain is implemented by multiple distributed nodes (hereinafter, referred to as "nodes") and a communication network that allows the multiple nodes to communicate with each other. Blockchain provides a consensus mechanism for establishing a consensus among the multiple nodes. When using a blockchain, the entire system including the multiple nodes and the communication network that allows the multiple nodes to communicate with each other may be regarded as a state transition system. Such a system has a high usability since the nodes each store the synchronized same ledger by using a blockchain. Transactions are transmitted from one node to other multiple nodes through the communication network. Then, the node receiving the transactions stores the multiple transactions in a block. In this process, the validity of the block needs to be verified by each node to secure the reliability of the ledger. To this end, the block needs to satisfy a certain condition defined by a consensus algorithm. There are various kinds of consensus algorithms, and, for example, Proof Of Work (PoW) is employed as the consensus algorithm for Bitcoin. Practical Byzantine Fault Tolerance (PBFT) and the like are also proposed as the consensus algorithm (see Non-patent document 2).

Each node verifies whether the pieces of information stored in the block are consistent with those of the other blocks. Additionally, each node verifies whether the block satisfies the condition defined by the consensus algorithm. Then, once it is verified that the block is consistent with the others and satisfies the condition defined by the consensus algorithm, each node adds the block to the ledger.

The above-described PoW is a stochastic consensus algorithm, which is designed such that the probability that a block may be replaced is lower as a time point in which the block was stored is earlier. Thus, strictly speaking, PoW does not bring multiple nodes into a complete consensus among them. On the other hand, PBFT verifies the validity of the block by voting, and thus brings multiple nodes into a complete consensus strictly. PBFT is utilized in a consortium blockchain and a private blockchain, which are described later.

PBFT provides a basic idea for a protocol for forming a precise consensus, and various kinds of protocols inspired by PBFT have been proposed by now. Although PBFT is applied as a protocol for forming a consensus in the later-described embodiment, a protocol applied to form a complete consensus is not limited to PBFT but may be any kind. In PBFT, one of the nodes attending the forming of a consensus plays the role of leader while the other nodes play the role of verifiers, and the consensus is formed by three steps. The three steps are pre-preparing step, preparing step, and committing step.

In the pre-preparing step, once transactions are issued, the transactions are transmitted to the node playing the role of leader (hereinafter, referred to as a "leader node") through a communication network formed by a P2P method. The leader node determines the order of the transactions to be processed and generates a block. Then, the leader node transmits the block to the multiple nodes playing the role of verifiers (hereinafter, referred to as "verifying nodes"). Each of the multiple verifying nodes verifies whether the transactions are correct and whether various values contained in the block are correct.

In the preparing step, each verifying node gives its own electronic signature to the verification result and transmits the result to the leader node and the other verifying nodes. Thus, each verifying node receives the verification results from the other verifying nodes. This allows each verifying node to confirm that the block is approved by a certain number or more of the verifying nodes.

In the committing step, when it is determined that the block is verified by the certain number or more of the verifying nodes, each verifying node transmits a committing message indicating that the block is committed to the other verifying nodes and the leader node. When receiving a certain number or more of the committing messages are received from the other verifying nodes, each verifying node adds the block to the ledger. When there is a database (DB) linked with the ledger, each verifying node simultaneously updates the DB as well.

After the advent of Bitcoin, a blockchain has been considered to be useful not only in the field of cryptocurrency but also in various fields. There have been attempts to apply the blockchain used for Bitcoin to a different field; however, since the blockchain used for Bitcoin is dedicated for cryptocurrency, it has been difficult in some cases to apply the blockchain to other fields that require complicated applications.

However, this situation has changed dramatically because of the proposal of Ethereum by Vitalik Buterin in 2014 (see Non-patent document 3). Ethereum is one of methods of implementing the blockchain that enables a user to generate and execute a Turing-complete program. In Ethereum, a developer can generate a program for executing any processing for any desired purpose, and each node can store certain data by using the program. In Ethereum, the user is provided with an address, and the program is also provided with an address. Once the user issues a transaction from the own address to the address provided to the program, the program is executed in an execution environment. In Ethereum, each node includes a database that stores a program code, data stored in the program, and so on in addition to the ledger. The ledgers and the databases are synchronized between the nodes constituting Ethereum.

As illustrated in FIG. 8, each node 3 transmits a block to the other nodes 3 through a communication network 4 to synchronize the ledgers and the databases stored in the nodes 3. The block includes a block main body and a block header. The block main body includes one or more transactions. Note that, the number of the transactions included in the block main body is not limited to one or more. For example, when the consensus algorithm is PoW, the number of the transactions included in the block main body may be zero or more. However, when the consensus algorithm is PBFT, the number of the transactions is one or more. The block header includes a hash value of a previous block header, a hash value of a list of transactions, and a hash value of the database. Then, when receiving the block, each node 3 executes a processing by a program based on the transaction included in the block as illustrated in FIG. 9. Since the header of the block includes a hash value of the shared DB (shared database), a consensus is established among the multiple nodes not only for the transaction but also for the state of the shared DB after the execution of the transactions, as illustrated in FIG. 10.

Bitcoin and Ethereum have been already operated as a public platform utilizing blockchain. In addition to the public platform, the consortium blockchain, the private blockchain, and the like have been known. In recent years, the consortium blockchain and the private blockchain have been getting attention because of an active attempt to apply the blockchain to services for enterprises. Although each enterprise constructs a platform utilizing a local blockchain and conducts demonstration experiments at now, it can be considered that the enterprises will operate a common platform in the future. However, the operation of the common platform has problems concerning the bloating and security of data including the ledger.

In a system using a blockchain, data is continuously generated and stored permanently as long as the system is kept being operated. Specifically, as a system is used at higher rate and has a larger amount of data generated and stored, the ledger and the database are larger in sizes. Additionally, a storage period of the data is determined for each platform. For this reason, when multiple enterprises use a common platform as described above, each enterprise cannot set freely the storage period. Moreover, when the common platform is operated, the data is stored in the common ledgers and databases of all the nodes, and this leads to the problem of the bloating of the ledgers and the databases.

Furthermore, when multiple enterprises use the common platform, data of one enterprise stored in the common platform is also stored by another enterprise. From the viewpoint of maintaining security, it can be considered to encrypt the data to prevent the node of the other enterprise from referring to the data of the one enterprise. However, even if the data is encrypted, there is a problem that, for example, the other enterprise may calculate a statistical value related to the data.

A quorum is a consortium or private platform in which an architecture of Ethereum is expanded to improve the security performance (see Non-patent document 4). Each node constituting a quorum includes two types of databases.

Specifically, each node includes a database similar to the databases owned by the nodes constituting Ethereum (hereinafter, referred to as a "shared database (shared DB)"). The shared DBs respectively owned by the nodes are shared among the nodes. Additionally, each node includes a private database (hereinafter, referred to as a "private database (private DB)"). The private DBs are shared by specific nodes out of all the nodes.

PRIOR ART DOCUMENT

Non-Patent Document

Non-patent document 1: Satoshi Nakamoto, [online], "Bitcoin: A Peer-to-Peer Electronic Cash System", [Searched on December 19. Heisei 29], the Internet <URL: https://Bitcoin.org/Bitcoin.pdf>

Non-patent document 2: Miguel Castro, and one other, "Practical Byzantine Fault Tolerance", Appears in the Proceedings of the Third Symposium on Operating Systems Design and Implementation, New Orleans, USA, February 1999

Non-patent document 3: "A Next-Generation Smart Contract and Decentralized Application Platform", Ethereum White Paper Non-patent document 4: https://github.com/jpmorganchase/Quorum-docs/blob/master/Quorum%20Whitepaper%20v01.pdf, Quorum White Paper

SUMMARY OF THE INVENTION

Problem to be Solved by the Invention

In the quorum, the state based on the execution result of a processing of a shared transaction shared across the entire system is stored in the shared DB. The state based on the execution result of a processing of a private transaction shared by only the specific nodes is stored in the private DB. The private transaction includes a part of the shared transaction except the data main body, and a hash value of the data main body. Additionally, the shared transaction and the private transaction are recorded in the ledger shared by all the nodes. The encrypted data main body is shared by the specific nodes. Moreover, the specific node decrypts the encrypted data main body and executes a processing based on the transaction included in the decrypted data main body. Then, the specific node stores in the private DB the state based on the execution result of the processing of the transaction.

Each node constituting the blockchain network using the quorum as described above includes the multiple databases named the shared DB and the private DB. Then, each node stores in the shared DB the state based on the execution result of the shared transaction and stores in the private DB the state based on the execution result of the private transaction. Thus, since the state based on the execution result of the private transaction is held by only the specific nodes, there is no need to form a new blockchain network including only the specific nodes. Accordingly, there is no need to share the state transition based on the execution result of the private transaction of the specific nodes with nodes other than the specific nodes. Additionally, since the state based on the execution result of the private transaction, which should be held by only the specific nodes, is not stored in the shared DB, it is possible to prevent the bloating of the data capacity of the shared DB.

However, in the quorum, since the state transition based on the execution result of the private transaction of the specific nodes is not shared by the nodes other than the specific nodes as described above, the nodes other than the specific nodes cannot verify the state transition. That is, through the existed consensus process, it is impossible for all the nodes to establish a consensus for the states of multiple databases of different sharing coverage. When the database owned by each node is only the shared database, it is possible to form a consensus for the state transition of the database between the nodes, with each node verifying the hash value of the database written in the header of the block. Therefore, a new mechanism for the private DB is required to detect an invalid operation such as a direct rewriting, determine a valid state, and keep the consistency among the nodes.

In a platform using a blockchain, nodes constituting the platform generate blocks. Each block includes a block main body and a block header. The block main body includes a transaction. The block header includes a hash value of the transaction included in the block main body, a hash value indicating the state of a database after the processing by the transaction, and the like. Each node verifies the validity of various kinds of information included in the block. Then, when the validity of the various kinds of information is verified, each node connects the newly generated block to the block most recently generated among blocks in the form of a chain stored in the ledger to store the newly generated block in the ledger. Specifically, the hash value in the block header of the block most recently generated is written in the newly generated block to store the newly generated block in the ledger. Each node updates the database based on the execution result of the transaction.

When only certain ones of the multiple nodes constituting the platform have the private DB that is not shared with the other nodes, the other nodes do not hold the state of the private DB of the certain nodes, and thus the other nodes cannot verify the state based on the execution result of the private transaction. Therefore, it has been impossible to form a consensus among all the nodes.

An object of the present invention made in view of the above circumstances is to provide a block verification device, a block verification method, and a program that can form a consensus also for the state of a private DB shared within a group.

Additionally, the present invention provides a technique for forming a consensus for the states of multiple private DBs of different sharing coverage when a blockchain system including multiple databases is used.

Means for Solving the Problem

In order to solve the above-described problems, a block verification device according to the present invention is a block verification device in a block verification system that includes a plurality of groups each including a plurality of block verification devices, the block verification device representing the block verification devices included in each group, including: a private database that is shared within the group; a communication unit that receives a list of transactions from an overall leader device, which is a block verification device representing all the plurality of the block verification devices; a transaction processing unit that executes the transactions identified based on the list and outputs the execution results; and a block processing unit that generates, based on the execution results, a proposal including the list, a digest of the private database after the execution of the transactions, and a private dataset as a collection of pieces of private data that are included in the transactions and are shared within the group, in which the communication unit transmits the proposal to the other block verification devices belonging to the same group, and transmits the list, the digest of the private database, and a digest of the private dataset to all the other block verification devices when it is determined that the block processing unit forms a consensus for the proposal.

Additionally, in order to solve the above-described problems, block verification device according to the present invention is a block verification device in a block verification system that includes multiple groups each including multiple block verification devices, the block verification device representing all the block verification devices including a private database that is shared within the group and a shared database that is shared by all the block verification devices, including: a communication unit that receives a transaction from another block verification device, transmits a list of the transactions to a group leader block verification device representing the block verification devices within the group, and receives the list, a digest of the private database after the execution of the transaction, and a private dataset as a collection of pieces of private data that are included in the transactions and are shared within the group, when the group leader block verification device generates, based on the execution results of the execution of the transactions identified based on the list, a proposal including the list, the digest of the private database, and the private dataset, and when it is determined that a consensus for the proposal is formed, which allows the list, the digest of the private database, and the digest of the private dataset to be transmitted; a transaction processing unit that executes the transactions corresponding to the list and obtains a state of the shared database updated based on the execution results; and a block processing unit that forms a consensus for a block including the list, the state, the digest of the private database after the execution of the transactions, and the digest of the private dataset, by transmitting the block to the other block verification device.

Moreover, in order to solve the above-described problems, a block verification method according to the present invention is a block verification method that is executed by a block verification device representing block verification devices belonging to any one of multiple groups included in a block verification system including multiple block verification devices, transmitting and receiving information to and from other multiple block verification devices, and including a private database shared within the group, including: receiving a list of transactions from an overall leader device, which is a block verification device representing all the multiple the block verification devices; executing the transactions identified based on the list and outputting the execution results; generating, based on the execution results, a proposal including the list, a digest of the private database, and a private dataset as a collection of pieces of private data that are included in the transactions and are shared within the group; transmitting the proposal to the other block verification devices belonging to the same group; and, when it is determined that a consensus for the proposal is formed, transmitting the list as well as the digest of the private data and the digest of the private dataset based on the execution of the transactions.

Furthermore, in order to solve the above-described problems, a block verification method according to the present invention is a block verification method that is executed by a block verification device in a block verification system that includes multiple groups each including multiple block verification devices, the block verification device representing all the block verification devices, and each of the block verification devices including a private database that is shared within the group and a shared database that is shared by all the block verification devices, including: receiving transactions from the other block verification devices; transmitting a list of the transactions to a group leader block verification device representing the block verification devices within the group; receiving the list, a digest of the private database after the execution of the transaction, and a private dataset as a collection of pieces of private data that are included in the transactions and are shared within the group, when the group leader block verification device generates, based on the execution results of the execution of the transactions identified based on the list, a proposal including the list, the digest of the private database, and the private dataset, and when it is determined that a consensus for the proposal is formed, which allows the list, the digest of the private database, and the digest of the private dataset to be transmitted; executing the transactions corresponding to the list and obtaining a state of the shared database updated based on the execution results; and forming a consensus for a block including the list, the state, as well as the digest of the private database and the digest of the private dataset after the execution of the transactions, by transmitting the block to the other block verification device.

In order to solve the above-described problems, a program according to the present invention causes a computer to function as a block verification device.

Effect of the Invention

According to the present invention, it is possible to form a consensus also for a private DB shared within a group.

MODE FOR CARRYING OUT THE INVENTION

Hereinafter, an embodiment of the present invention is described in detail with reference to the drawings.

First Embodiment

Figure 1:
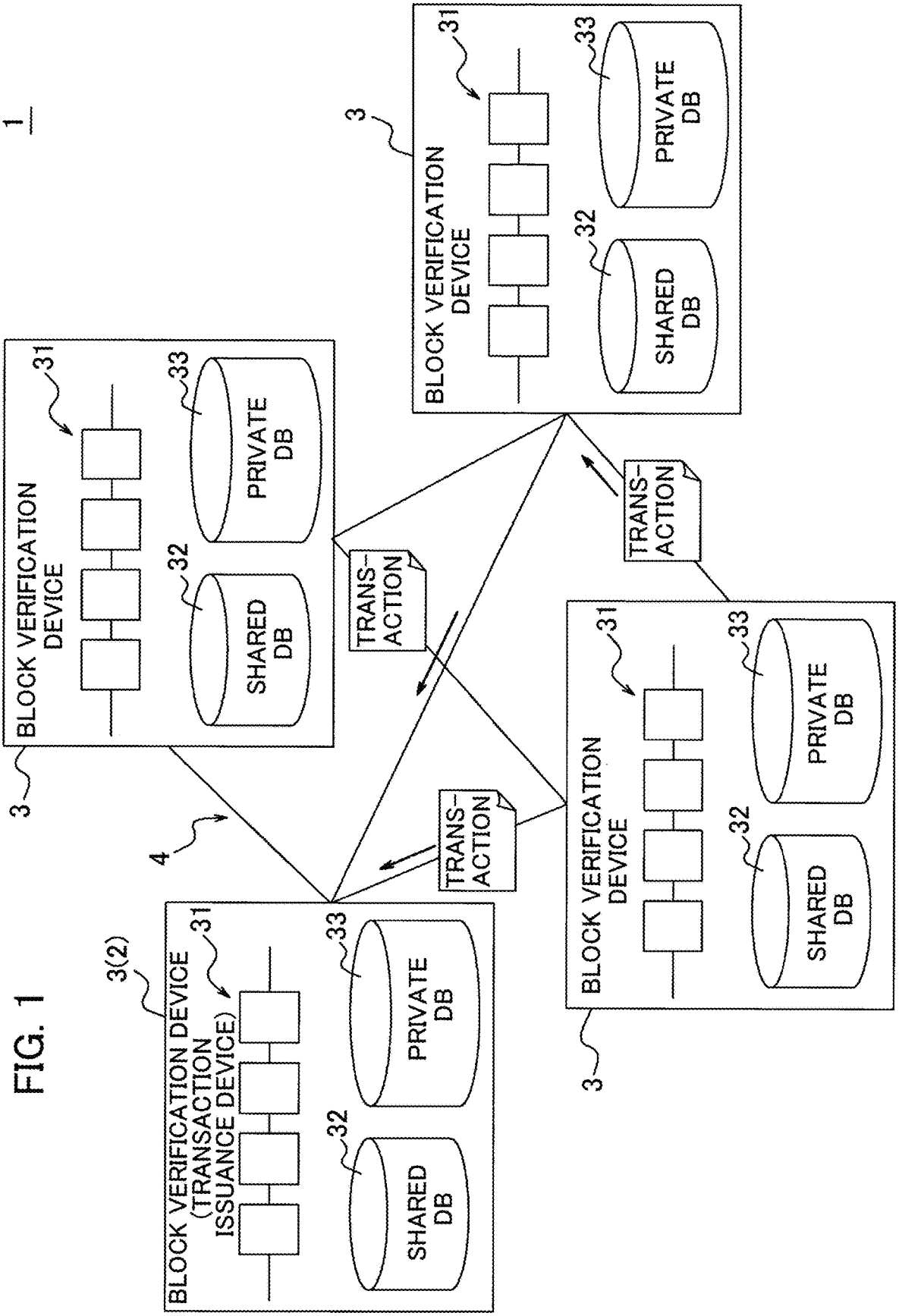
FIG. 1 is a conceptual diagram illustrating an example of a block verification system according to an embodiment of the present invention.

FIG. 1 illustrates a configuration example of a block verification system 1 according to an embodiment of the present invention. As illustrated in FIG. 1, the block verification system 1 includes multiple computers. The multiple computers are connected with each other through a P2P (Peer to Peer) type communication network and transmit and receive data to and from the other.

Each computer functions as a transaction issuance device 2 or functions as a block verification device 3 depending on a roll in each case in the block verification system 1. Here, any one of the multiple computers may function as the transaction issuance device 2 without functioning as the block verification device 3. Any one of the multiple computers may function as the block verification device 3 without functioning as the transaction issuance device 2.

Note that, the number of the computers connected to the communication network in the block verification system 1 illustrated in FIG. 1 is an example and is not limited thereto.

The transaction issuance device 2 issues a transaction based on input by a user and transmits the transaction to the multiple block verification devices 3 through the communication network.

Figure 2:
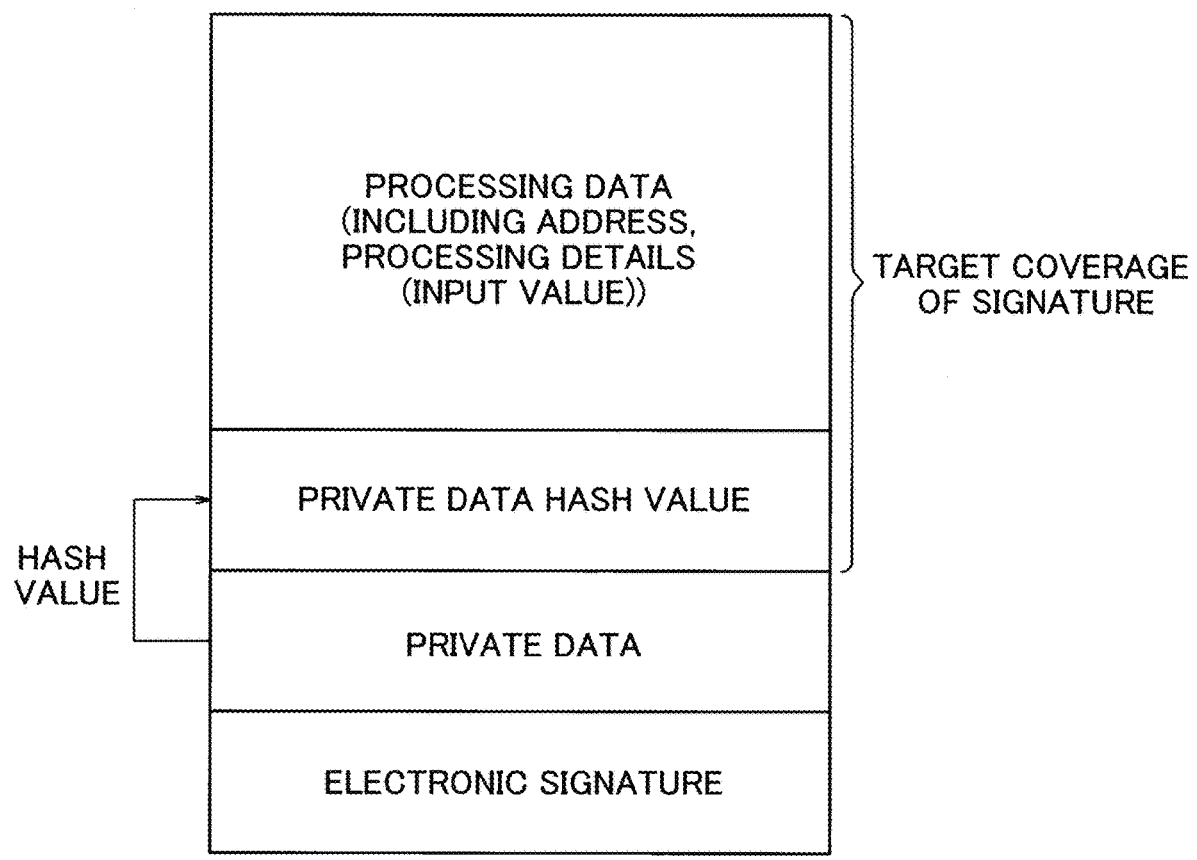
FIG. 2 is a conceptual diagram illustrating a configuration example of a transaction transmitted and received by a block verification device according to the embodiment of the present invention.
Figure 11:
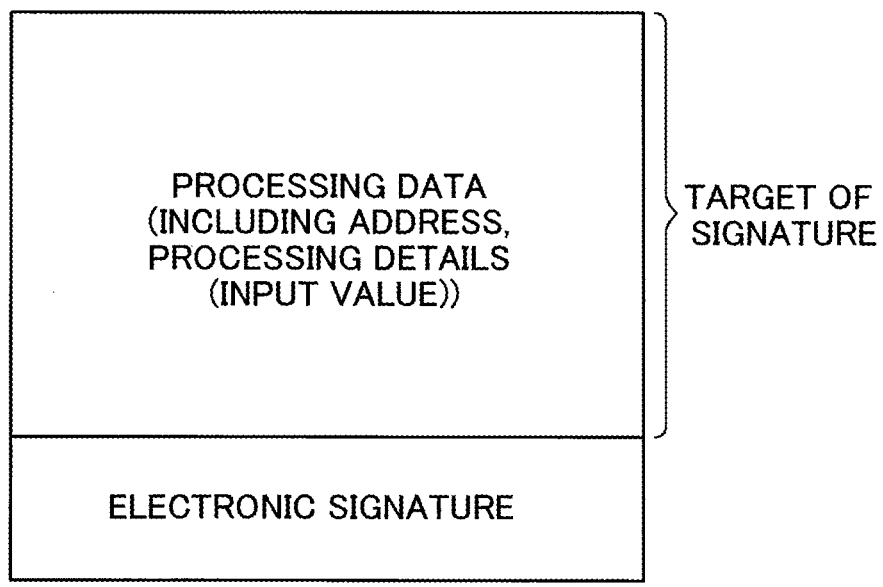
FIG. 11 is a conceptual diagram illustrating a configuration example of a transaction.

A transaction illustrated in FIG. 11 includes processing data and an electronic signature, and the target of the electronic signature is the processing data. On the other hand, as illustrated in FIG. 2, a transaction of this embodiment includes processing data, private data, a private data hash value, and an electronic signature. The processing data may be, for example, information indicating as a destination a program for executing the processing stored in a shared DB or may be information indicating the processing details. The processing data is shared by all the block verification devices 3 included in the block verification system 1. The electronic signature is an electronic signature covering the processing data and the private data hash value as targets. The private data is data that is not included as the target of the electronic signature, and this allows the private data to be separated from the transaction. The private data hash value is a hash value calculated by computing the private data with a hash function.

Since the private data is not included in the target coverage of the electronic signature, there is apprehension that the private data may be falsified by a malicious third person. However, because the electronic signature is applied for both the processing data and private data hash value, when the private data is falsified for instance, a mismatch occurs between the hash value of the falsified private data and the private data hash value included in the transaction. Thus, it is possible to find the falsification.

<Block Verification System in which Private DB is Shared Across Entire System>

First, a case where a private DB is shared by all the block verification devices 3 in the block verification system 1 is described.

Figure 3:
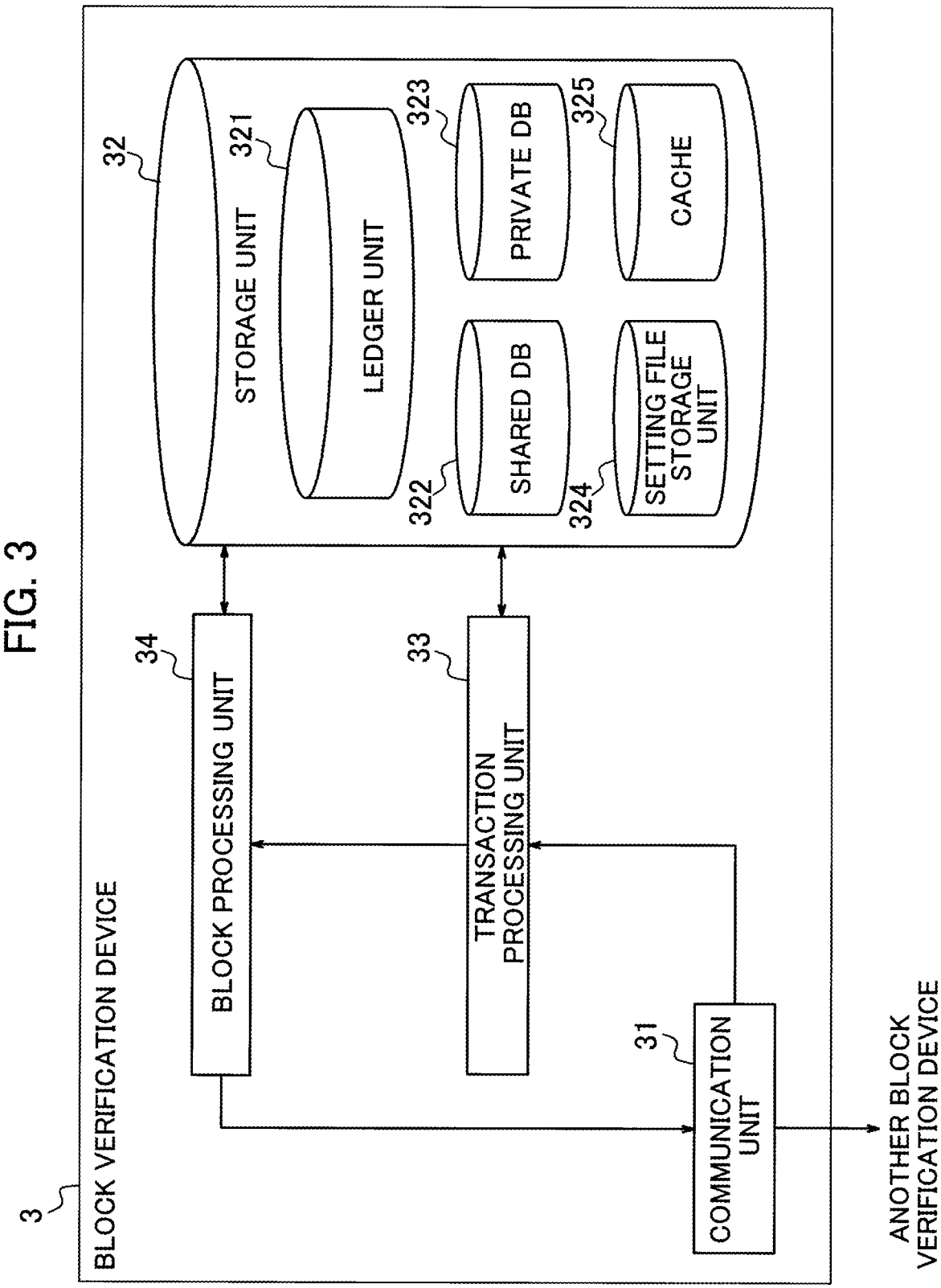
FIG. 3 is a block diagram illustrating a configuration example of the block verification device according to the embodiment of the present invention.

As illustrated in FIG. 3, the block verification device 3 includes a communication unit 31, a storage unit 32, a transaction processing unit 33, and a block processing unit 34.

The communication unit 31 receives data from the transaction issuance device 2, and transmits and receives data to and from the other block verification devices 3.

The storage unit 32 includes a ledger unit 321, a shared DB 322, a private DB 323, a setting file storage unit 324, and a cache 325.

The ledger unit 321 stores a collection of one or more of blocks. Each block includes transactions and a hash value of the block most recently created. In the ledger unit 321, the one or more blocks are stored while being linked in the form of a chain. "Being linked" means that, as described above, each block includes a hash value in the block header of the last previous block. With this, for example, when any one of the blocks linked with each other by the blockchain is falsified, the hash value in the block header of the block turns into a completely different value. This means that the hash value in the block header is different from the hash value written in the block header of the next block. Accordingly, the falsification of the transaction information is discovered, and this is utilized as a mechanism for preventing the falsification.

The shared DB 322 stores a program and a code. The shared DB 322 stores the state based on the execution result of a processing with a transaction on the data stored in the shared DB.

The private DB 323 stores the state based on the execution result of a processing with a transaction on the private data.

The setting file storage unit 324 stores details of the processing on the private data as a setting file when the processing details are determined in advance between nodes before the construction of the blockchain network.

The cache 325 stores temporarily the block including the transactions that is generated by the block processing unit 34.

Figure 4:
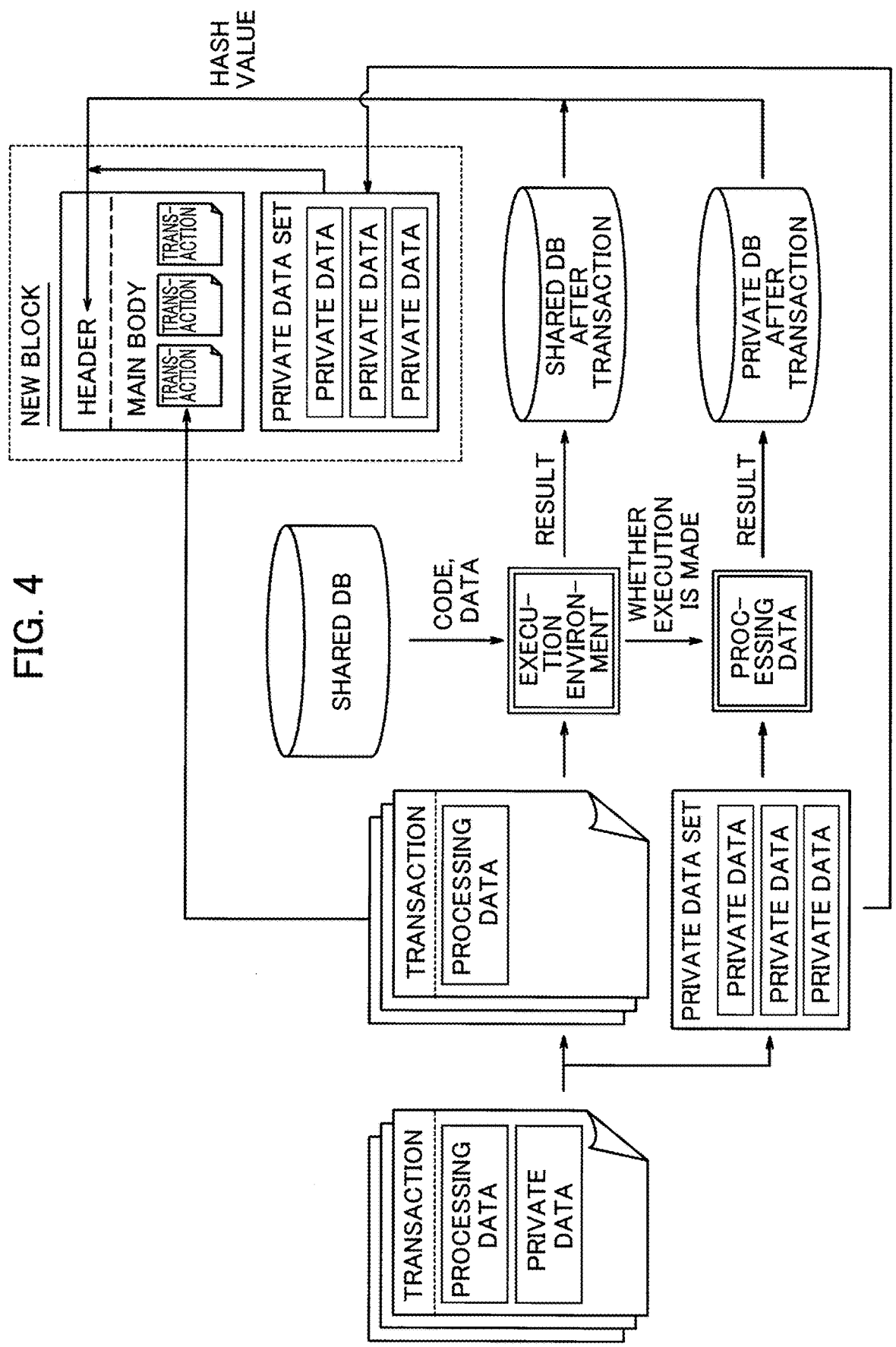
FIG. 4 is a conceptual diagram for describing generation of a block by each node.

The transaction processing unit 33 verifies the validity of the transaction received by the communication unit 31. Specifically, the transaction processing unit 33 verifies whether there is no falsification in the private data based on the signature included in the transaction. Once the validity of the transaction is verified, the transaction processing unit 33 executes the processing described in the processing data in an execution environment. In this process, as illustrated in FIG. 4, the transaction processing unit 33 executes the processing on the data stored in the shared DB 322 in the execution environment by using the code and the program that are described in the processing data and stored in the shared DB 322. Additionally, the transaction processing unit 33 outputs the execution result of the processing described in the processing data to the block processing unit 34.

Moreover, once the execution of the processing on the data stored in the shared DB 322 is succeeded, the transaction processing unit 33 executes the processing described in the processing data on the private data included in the transaction. Furthermore, the transaction processing unit 33 outputs the execution result of the processing on the private data to the block processing unit 34. The transaction processing unit 33 may execute the processing on the private data based on the setting file that is stored in advance in the setting file storage unit 324. The transaction processing unit 33 may use the shared DB 322 in addition to the setting file to define the processing on the private data like grouping and execute the processing based on the definition.

Additionally, the block processing unit 34 calculates a shared hash value, which is a hash value of the shared DB 322 (shared DB after transactions) storing the state based on the execution result of the processing described in the transaction. Likewise, the block processing unit 34 calculates a private hash value, which is a hash value of the private DB 323 (private DB after transactions) storing the state after the execution of the processings described in the transactions. Moreover, the block processing unit 34 generates as a new block a block including a transaction group that is a collection of transactions not including the private data, the shared hash value, and the private hash value. The block processing unit 34 stores the thus-generated new block in the cache 325 as an undetermined block.

Furthermore, the block processing unit 34 generates a private dataset that is a collection of one or more pieces of the private data included in each transaction.

Figure 5:
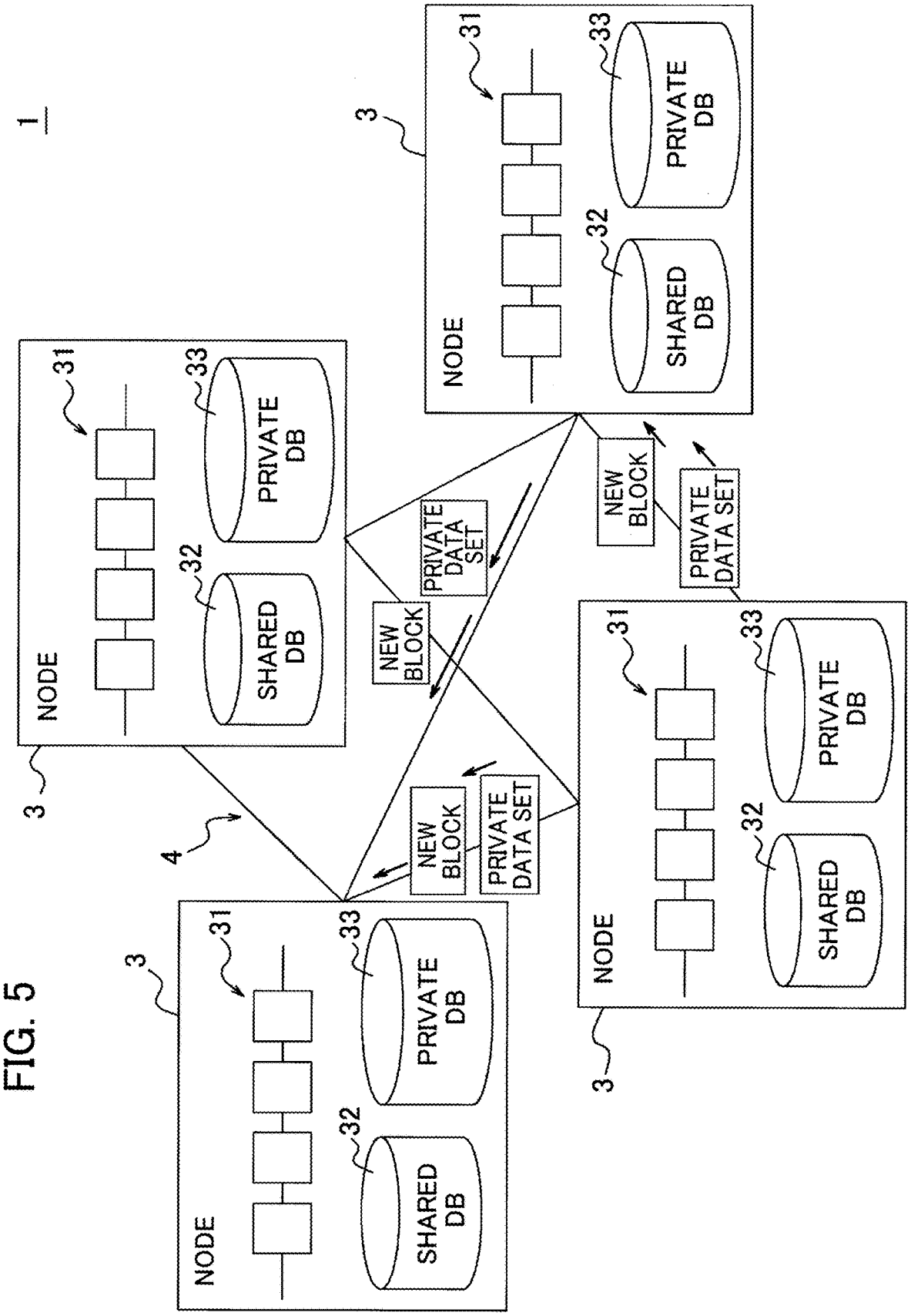
FIG. 5 is a conceptual diagram for describing transmission of a new block illustrated in FIG. 4 to other nodes.

The communication unit 31 associates the private dataset and the new block generated by the block processing unit 34 with each other and transmits the private dataset and the new block to the other block verification devices 3 as illustrated in FIG. 5.

The communication unit 31 of the block verification device 3 receives the private dataset and the new block associated with each other. Now, a processing for the case where the block verification device 3 receives the private dataset and the new block is described.

The transaction processing unit 33 uses the private dataset and the new block associated with each other, which are received by the communication unit 31, to verify the signature applied to the transaction. Additionally, the transaction processing unit 33 identifies the private data by using the hash value of the private data. Moreover, the transaction processing unit 33 verifies the states of the shared DB 322 and the private DB 323 after the execution of the transactions. When the validity of the states of the shared DB 322 and the private DB 323 is verified, the transaction processing unit 33 adds the block to the ledger unit 321 and updates the shared DB 322 and the private DB 323.

<Block Verification System in which Private DB is Shared within Each Group>

Next, formation of a consensus in a case where the block verification system 1 includes multiple groups, and each block verification device 3 belongs to any one of the groups is described. The private DB 323 of the block verification device 3 belonging to each group is shared only within the group.

Figure 6:
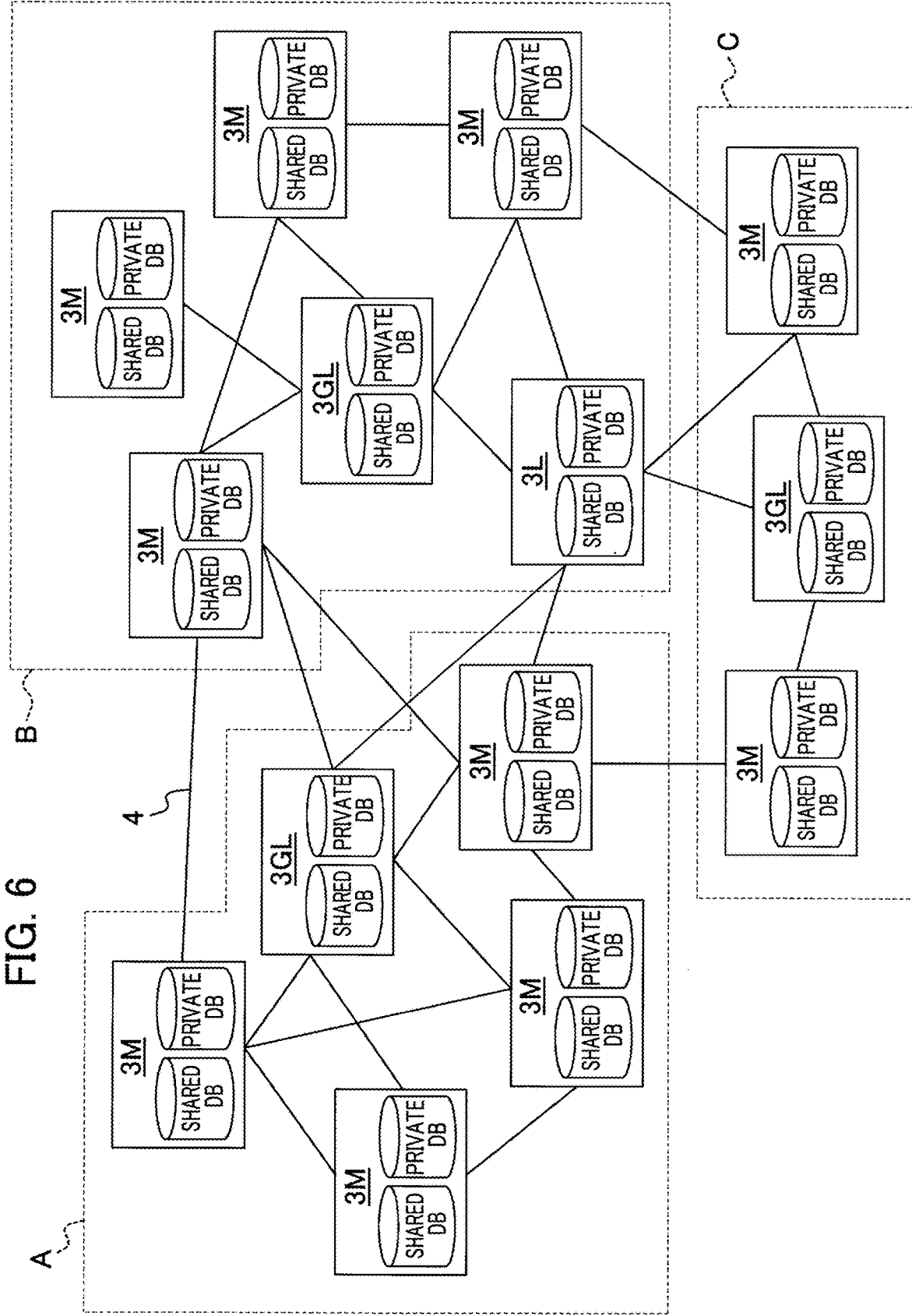
FIG. 6 is a conceptual diagram for describing grouping in a blockchain.

Specifically, as illustrated in FIG. 6, an example in which the block verification system 1 includes three groups is described. Hereinafter, the three groups are referred to as a group A, a group B, and a group C, respectively. Additionally, among the multiple block verification devices 3 belonging to each group, a block verification device 3 representing the corresponding group is referred to as a "group leader device" (group leader block verification device) 3GL.

Additionally, a block verification device 3 other than the group leader device 3GL is referred to as a "member device 3M". Moreover, a single block verification device 3 representing all the block verification devices 3 constituting the block verification system 1 is referred to as an "overall leader device" (overall leader block verification device) 3L.

(First Consensus Forming Process)

Once the transaction illustrated in FIG. 2 is issued by the transaction issuance device 2, the communication unit 31 of each block verification device 3 transmits data to the groups to which the other block verification devices 3 as transmission destinations belong, depending on the groups. Specifically, the communication unit 31 transmits a transaction including the private data to the other block verification devices 3 belonging to the same group. On the other hand, the communication unit 31 transmits a transaction not including the private data to the other block verification device 3 belonging to different groups. In this process, the communication unit 31 determines the groups to which the other block verification devices 3 belong based on the setting stored in advance in the setting file storage unit 324. Additionally, the communication unit 31 may determine the groups to which the other block verification devices 3 belong by executing the program stored in the shared DB 322 by the transaction.

The communication unit 31 of the overall leader device 3L receives the transaction including the private data or the transaction not including the private data from the communication unit 31 of each block verification device 3. In the example illustrated in FIG. 6, the overall leader device 3L belongs to the group B. Thus, the transactions received from the block verification devices 3 belonging to the group A and the group C do not include the private data, but the transactions received from the block verification devices 3 belonging to the group B include the private data.

The transaction processing unit 33 of the overall leader device 3L verifies the validity of the received transactions and tentatively determines transactions to be included in the block. The communication unit 31 of the overall leader device 3L transmits a list of the tentatively determined transactions (first transaction list), not a block, to each group leader device 3GL. In this process, the overall leader device 3L requests each group leader device 3GL to executes a processing based on the list of the transactions transmitted by the overall leader device 3L and requests each group leader device 3GL to transmit a digest of the state based on the execution result to the overall leader device 3L. The list may be the transactions themselves or may be information for identifying the transactions. The digest is abstract data such as a hash value, for example.

The communication unit 31 of each group leader device 3GL receives the list of the transactions from the overall leader device 3L. Once the communication unit 31 receives the list, the transaction processing unit 33 confirms whether the private data corresponding to a transaction identified by the list is stored in the cache 325 of the storage unit 32. When it is confirmed that the corresponding private data is stored, the transaction processing unit 33 executes the transactions and outputs the execution results to the block processing unit 34. Specifically, the transaction processing unit 33 makes a determination on each transaction set in the received list to see whether there is the private data corresponding to the transaction in the storage unit 32. For the transaction corresponding to the private data that is stored, the transaction processing unit 33 determines that the transaction is a transaction of the group to which the transaction processing unit 33 itself belongs, and executes the transaction. For the transaction corresponding to the private data that is not stored, the transaction processing unit 33 determines that the transaction is a transaction of a group other than the group to which the transaction processing unit 33 itself belongs, and does not execute the transaction. Once the execution results are outputted by the transaction processing unit 33, the block processing unit 34 generates a proposal based on the execution results. The proposal includes a list of the transactions based on the execution results (second transaction list), a digest of the private DB 323 after the execution, and the private dataset. The list of the transactions based on the execution results is a list according to the execution of the transactions and, specifically, is a list of the transactions executed by the transaction processing unit 33 (that is, transactions of the group to which the group leader device 3GL belongs). The block processing unit 34 generates the transaction list for own group in which only the transactions executed by the transaction processing unit 33 are set.

Once the block processing unit 34 of the group leader device 3GL generates the proposal, the communication unit 31 transmits the proposal to the block verification devices 3 including the member devices 3M belonging to the group of the group leader device 3GL. Then, consensuses for the proposal are formed by a definite consensus process such as PBFT, for example.

Once the consensus for the proposal is formed in each group, each group leader device 3GL transmits the list of the transactions included in the proposal for which the consensuses are formed, the digest of the private DB 323 after the execution of the transactions, and a digest of the private dataset to all the other block verification devices 3 constituting the block verification system 1. In this process, instead of each group leader device 3GL, an arbitrary member device 3M belonging to the corresponding group may transmit the list of the transactions, the digest of the private DB 323 after the execution of the transactions, and the digest of the private dataset. This allows the block verification devices 3 belonging to the specific group to keep the private data. Additionally, the block verification devices 3 belonging to the other groups can keep the transactions for which the consensuses are formed in the specific group, the digest of the state of the private DB 323 after the execution of the transactions, and the digest of the private dataset.

(Second Consensus Forming Process)

The communication unit 31 of the overall leader device 3L receives the lists of the transactions for which the consensuses are formed (second transaction lists), the digests of the states of the private DBs 323, and the digests of the private datasets from the block verification devices 3 (group leader devices 3GL) belonging to the respective groups. Then, the block processing unit 34 of the overall leader device 3L generates a block while excluding from the tentative transactions among the tentatively determined transactions a transaction that is not received from each group leader device 3GL. That is, the block processing unit 34 of the overall leader device 3L generates a list of transactions (third transaction list), which is generated by referring to the tentative transactions set in the list (first transaction list) that is transmitted to each of the group leader devices 3GL, and excluding from the above-described list (first transaction list) an invalid transaction not included in any of all the lists (second transaction lists) transmitted from the group leader devices 3GL. Then, the block processing unit 34 generates a block by using the transactions of the list (third transaction list) from which an invalid transaction is excluded.

The transaction processing unit 33 of the overall leader device 3L executes the transactions in the order of the lists of the transactions received from each group leader and obtains the state of the shared DB 322 based on the execution result. That is, the transaction processing unit 33 sequentially executes the transactions set in the list from which an invalid transaction is excluded (third transaction list) so as not to change the order of the transactions set in the list of each group received from the corresponding group leader (second transaction list). The block processing unit 34 of the overall leader device 3L generates a block including the list of the transactions, the digest of the shared DB 322, the digests of the private DBs 323 of the groups, and the digests of the private datasets of the groups, and transmits the list and the digests to the other block verification devices 3. Then, consensuses for the block generated by the overall leader device 3L are formed by all the block verification devices 3 by using a definite consensus forming algorithm such as PBFT, for example. In this process, consensuses for the private DBs 323 and the private datasets of the other groups are formed by confirming that consensuses are formed through the first consensus forming process.

Figure 7:
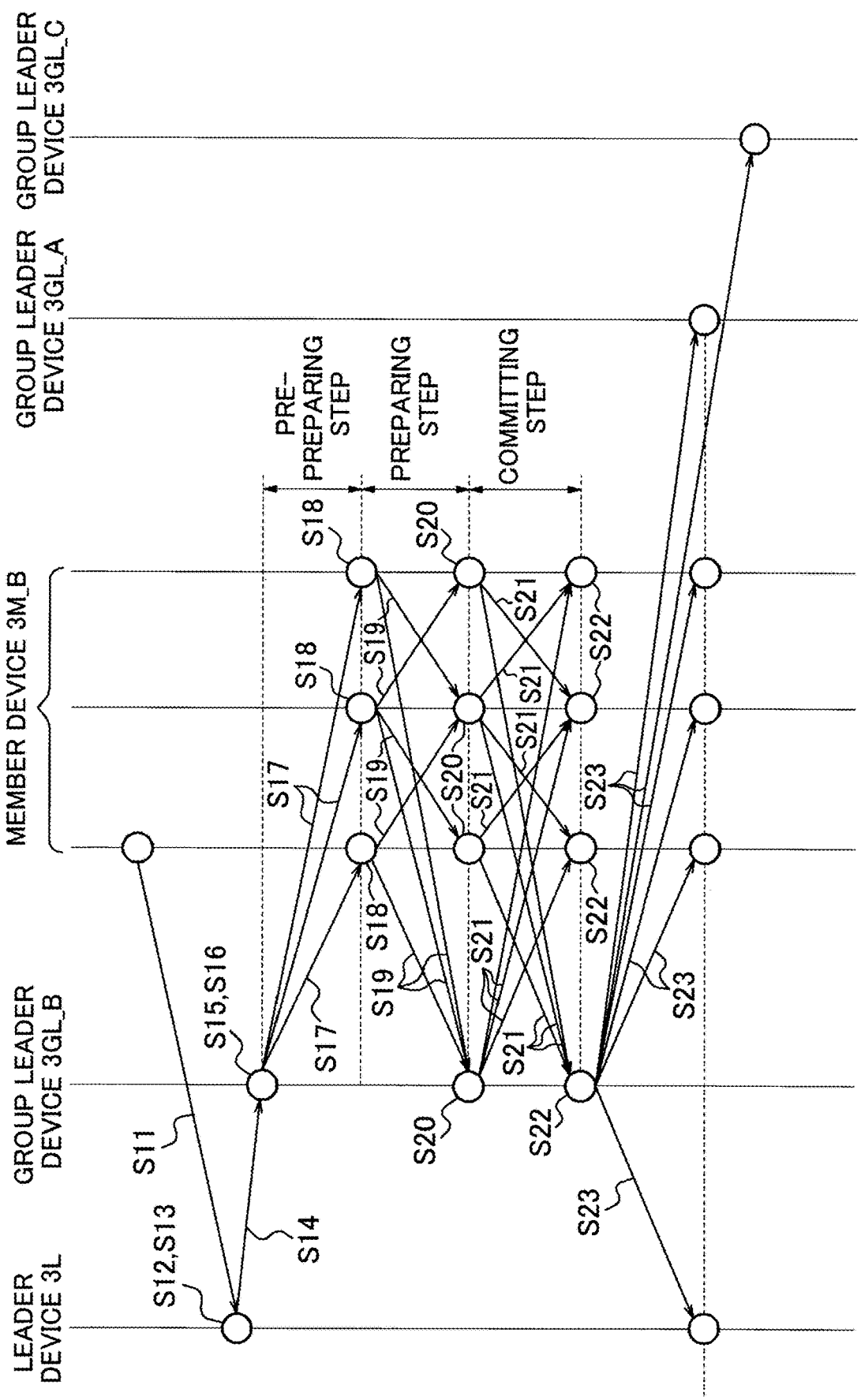
FIG. 7 is a schematic diagram for describing formation of a consensus in the grouped blockchain.
Figure 8:
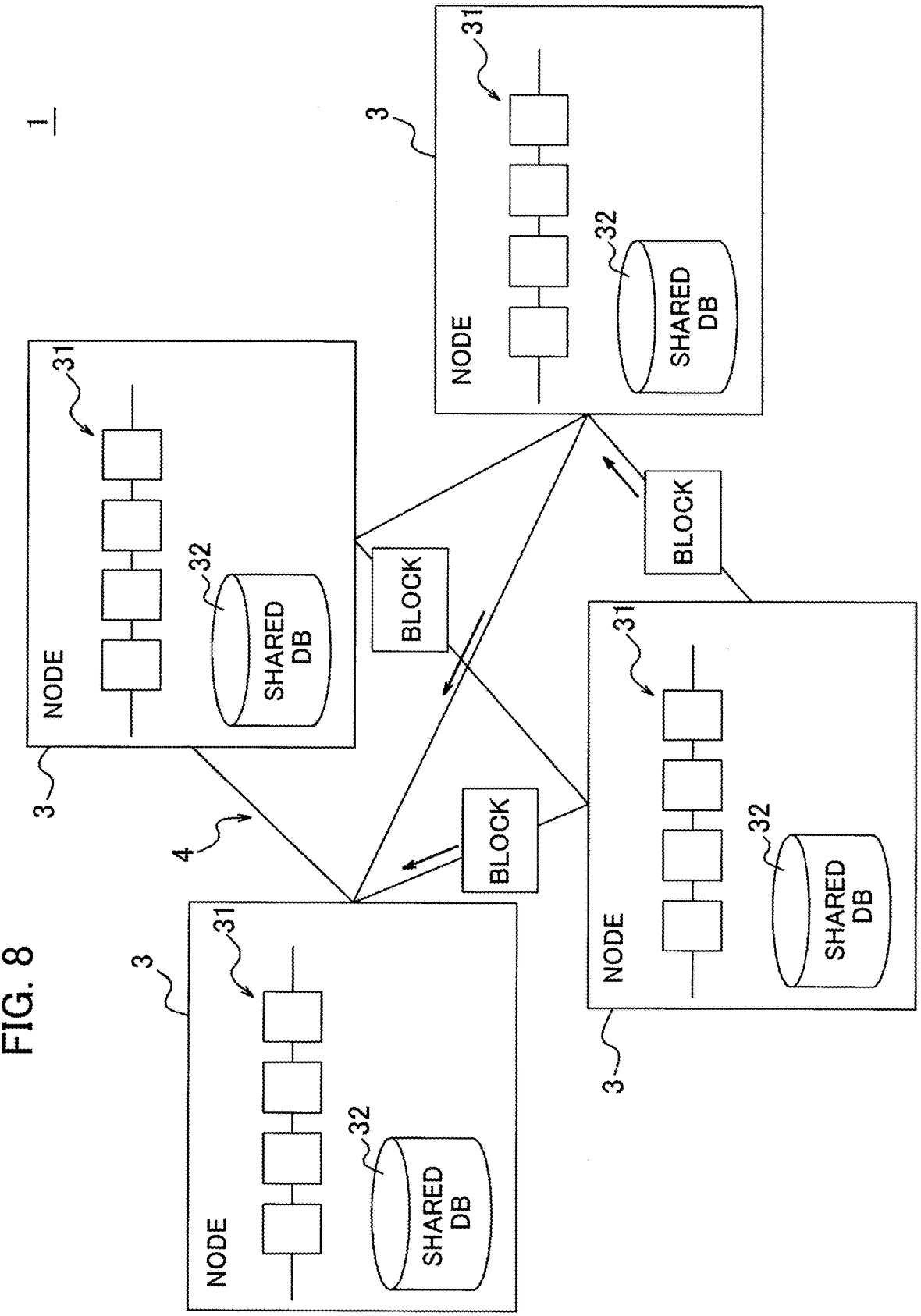
FIG. 8 is a conceptual diagram illustrating an example of the block verification system using a blockchain.
Figure 9:
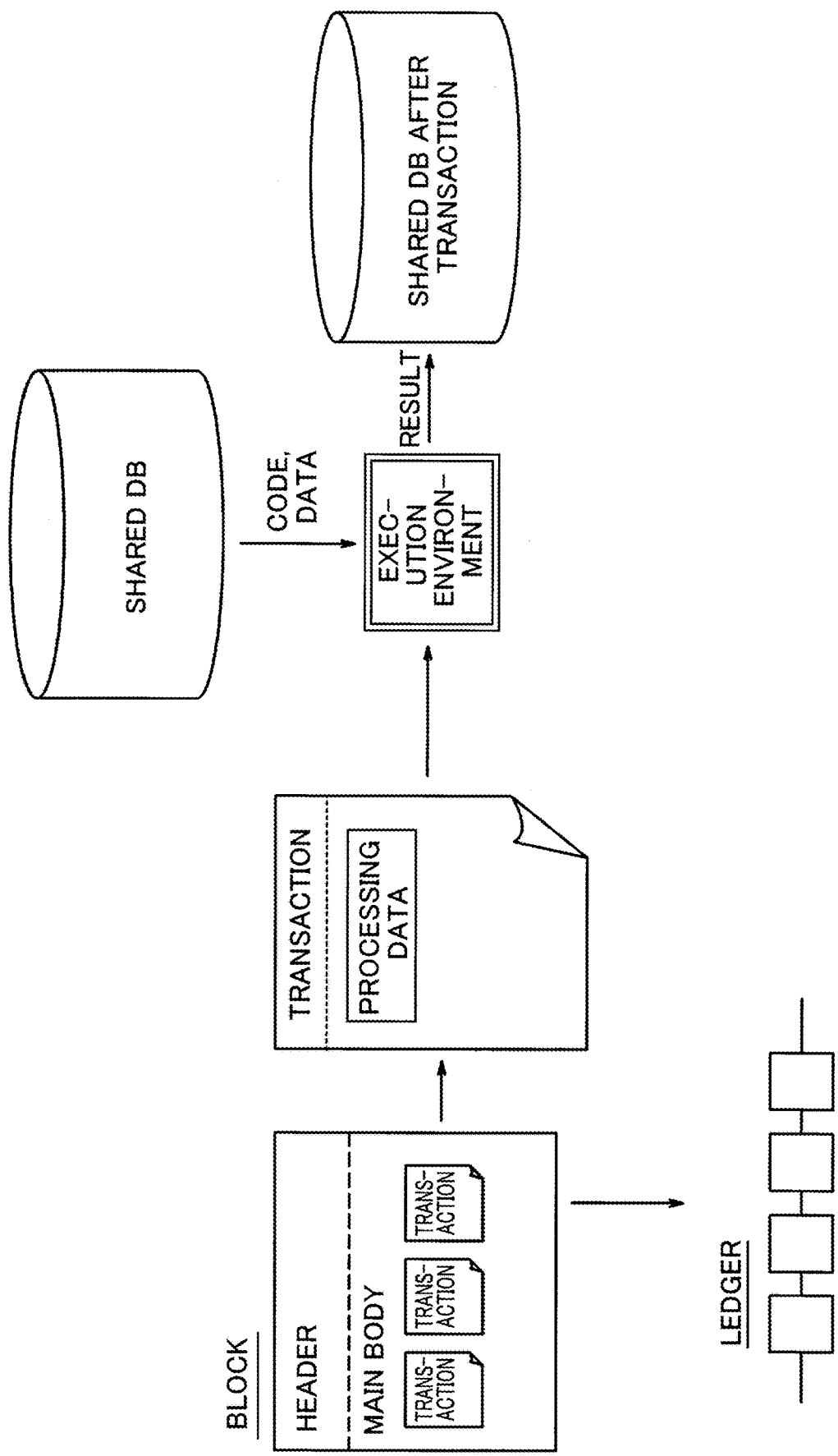
FIG. 9 is a conceptual diagram for describing generation of a block.
Figure 10:
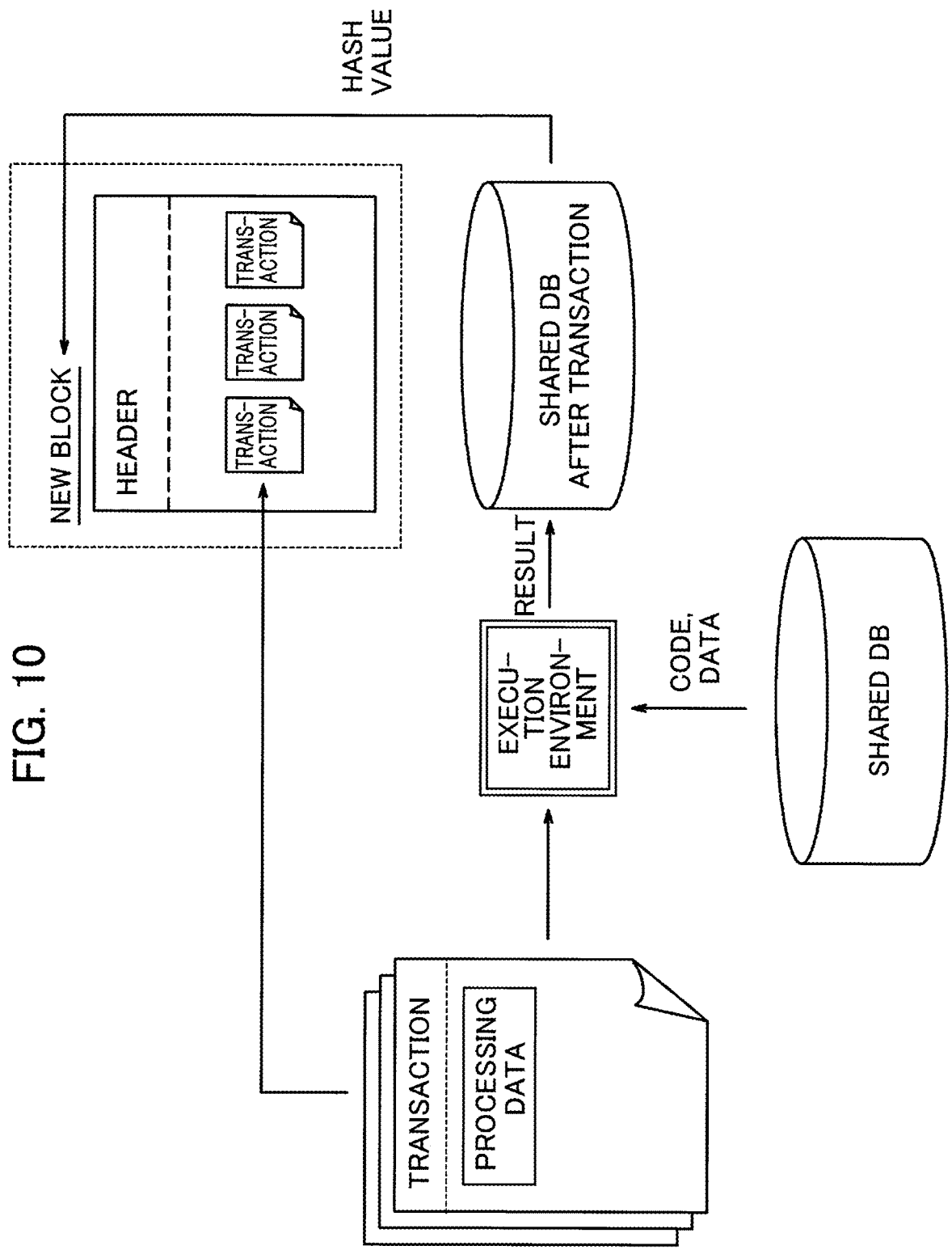
FIG. 10 is a conceptual diagram for describing generation of a block.

Subsequently, a block verification method of the block verification system 1 according to this embodiment is described with reference to FIG. 7.

The communication unit 31 of each block verification device 3 transmits a transaction to the overall leader device 3L (step S11). Specifically, when the overall leader device 3L belongs to the group same as that of the block verification device 3, the communication unit 31 of the block verification device 3 transmits the transaction including the private data. On the other hand, when the overall leader device 3L belongs to a group different from that of the block verification device 3, the communication unit 31 of the block verification device 3 transmits the transaction not including the private data. FIG. 7 illustrates an example in which a member device 3M_B belonging to the group B transmits the transaction to the overall leader device 3L.

Once the communication unit 31 of the overall leader device 3L receives the transaction from the block verification device 3, the transaction processing unit 33 of the overall leader device 3L verifies the transaction (step S12).

Once it is verified that the transaction is valid, the transaction processing unit 33 tentatively determines the transaction as the one to be included in the block (step S13).

The communication unit 31 of the overall leader device 3L transmits the list of the transactions to the group leader device 3GL (step S14). Note that, FIG. 7 illustrates an example in which the list of the transactions is transmitted to a group leader device 3GL_B, which is the group leader device 3GL belonging to the group B.

Once the communication unit 31 of the group leader device 3GL receives the list of the transactions, the transaction processing unit 33 of the group leader device 3GL executes the transactions and outputs the execution results to the block processing unit 34 (step S15).

The block processing unit 34 of the group leader device 3GL generates the proposal including the list based on the execution results, the digest of the private DB 323 after the execution, and the private dataset (step S16).

The communication unit 31 of the group leader device 3GL transmits the proposal to each of the member devices 3M in the group to which the group leader device 3GL belongs (step S17). Note that, FIG. 7 illustrates an example in which the group leader device 3GL_B transmits the proposal to each of the member devices 3M_B belonging to the group B.

The transaction processing unit 33 of each member device 3M verifies the proposal (step S18).

Once it is verified that the proposal is valid in step S18, the communication unit 31 of each member device 3M applies the own electronic signature to the proposal and transmits the proposal to the other block verification devices 3 in the group including the group leader device 3GL (step S19).

Once the proposal to which the electronic signature is applied is transmitted from more than a certain number of the block verification devices 3 in step S19, the block processing units 34 of the block verification devices 3 in the group (the group leader device 3GL and the member devices 3M) determine that consensuses for the proposal are formed (step S20).

The communication unit 31 of each block verification device 3 transmits the fact that the consensuses are formed to the other block verification devices 3 (step S21) and adds a block to the ledger (step S22).

The group leader device 3GL transmits the list of the transactions included in the proposal for which the consensuses are formed, the digest of the private DB 323 after the execution of the transactions, and the digest of the private dataset to all the other block verification devices 3 including the block verification devices 3 of the other groups (step S23). Note that, FIG. 7 illustrates an example in which the group leader device 3GL_B transmits the list of the transactions, the digest of the private DB 323 after the execution of the transactions, and the digest of the private dataset to devices such as a group leader device 3GL_A and a group leader device 3GL_C, which are respectively belonging to the group A and the group C.

Note that, it is possible to favorably use a computer to cause the computer to function as the above-described block verification device 3. In such a computer, a program in which processing details for implementing the functions of the block verification device 3 are described is stored in a database of the computer. With the program read and executed by a CPU of the computer, the computer can implement the functions as the block verification device 3.

Additionally, the program may be recorded in a computer-readable medium. Use of the computer-readable medium makes it possible to install a program to the computer. In this case, the computer-readable medium in which a program is recorded may be a non-transitory recording medium. The non-transitory recording medium is not particularly limited and may be, for example, a recording medium such as a CD-ROM and a DVD-ROM.

As described above, according to this embodiment, the block verification device 3 as the group leader device 3GL executes transactions identified based on the list received from the overall leader device 3L, generates a proposal based on the execution results, and transmits the proposal to the other block verification devices 3 belonging to the same group. Then, once it is determined that consensuses for the proposal are formed, the group leader device 3GL transmits a list of the transactions as well as the digest of the private DB 323 and the digest of the private dataset after the execution of the transactions to all the block verification devices 3. This allows the block verification system 1 to also form consensuses for the states of the private DBs 323 of different sharing coverage. Additionally, according to this embodiment, in the case of a blockchain system having multiple databases, consensuses for the states of multiple private DBs having different sharing coverage are formed by utilizing a definite consensus process such as PBFT.

The above-described embodiment is described as a representative example. However, it is apparent to those skilled in the art that various changes and replacements can be made without departing from the spirit and the scope of the present invention. Therefore, the present invention should not be construed to be limited by the above-described embodiment, and various modifications and changes are possible without departing from the scope of patent claims.

EXPLANATION OF THE REFERENCE NUMERALS 1 block verification system
2 transaction issuance device
3 block verification device
4 communication network
31 communication unit
32 storage unit
33 transaction processing unit
34 block processing unit
321 ledger unit
322 shared DB
323 private DB
324 setting file storage unit
325 cache

The invention claimed is:

1. A block verification device in a block verification system that includes a plurality of groups each including a plurality of block verification devices, the block verification device representing the block verification devices included in each group, comprising:
    a private database that is shared within the group;
    a communication unit that receives a first transaction list from an overall leader device, which is a block verification device representing all the plurality of the block verification devices;

a transaction processing unit that executes transactions identified based on the first transaction list; and a block processing unit that generates a proposal including a second transaction list according to the execution of the transactions, a digest of the private database after the execution of the transactions, and a private dataset as a collection of pieces of private data that are included in the transactions and are shared within the group, wherein the communication unit transmits the proposal to the other block verification devices belonging to the same group, and transmits the second transaction list, the digest of the private database, and a digest of the private dataset to all the other block verification devices when it is determined that the block processing unit forms a consensus for the proposal, and one or more computer processing units which are configured to execute functions of the communication unit, the transaction processing unit, and the block processing unit.

2. A block verification device in a block verification system that includes a plurality of groups each including a plurality of block verification devices, the block verification device representing all the block verification devices, comprising:

a private database that is shared within the group;

a shared database that is shared by all the block verification devices;

a communication unit that transmits a first transaction list to each group leader block verification device representing the block verification devices within the group and receives a second transaction list generated according to execution of transactions identified based on the first transaction list, a digest of the private database after the execution of the transactions, and a digest of a private dataset as a collection of pieces of private data that are included in the transactions and are shared within the group when the group leader block verification device forms a consensus for a proposal including the second transaction list, the digest of the private database, and the private dataset;

a transaction processing unit that executes transactions corresponding to the second transaction list received from each group leader block verification device and obtains a state of the shared database updated based on the execution results; and a block processing unit that forms a consensus for a block including a list of transactions executed by the transaction processing unit, the state of the shared database, the digest of the private database, and the digest of the private dataset, by transmitting the block to another block verification device, and one or more computer processing units which are configured to execute functions of the communication unit, the transaction processing unit, and the block processing unit.

3. A block verification method that is executed by a block verification device in a block verification system that includes a plurality of groups each including a plurality of block verification devices, the block verification device representing the block verification devices included in each group, and the block verification device including a private database that is shared within the group, comprising:

receiving a first transaction list from an overall leader device, which is a block verification device representing all the plurality of the block verification devices;

executing transactions identified based on the first transaction list;

generating a proposal including a second transaction list according to the execution of the transactions, a digest of the private database, and a private dataset as a collection of pieces of private data that are included in the transactions and are shared within the group;

transmitting the proposal to the other block verification devices belonging to the same group; and when a consensus for the proposal is formed, transmitting the second transaction list as well as the digest of the private data and the digest of the private dataset based on the execution of the transactions to all the other block verification devices.

4. A block verification method that is executed by a block verification device in a block verification system that includes a plurality of groups each including a plurality of block verification devices, the block verification device representing all the block verification devices, and the block verification device including a private database that is shared within the group and a shared database that is shared by all the block verification devices, comprising:

transmitting a first transaction list to each group leader block verification device representing the block verification devices within the group;

receiving a second transaction list generated according to the execution of transactions identified based on the first transaction list, a digest of the private database after the execution of the transactions, and a digest of a private dataset as a collection of pieces of private data that are included in the transactions and are shared within the group when the group leader block verification device forms a consensus for a proposal including the second transaction list, the digest of the private database, and the private dataset;

executing transactions corresponding to the second transaction list received from each group leader block verification device and obtaining a state of the shared database updated based on the execution results; and forming a consensus for a block including a list of the executed transactions, the state of the shared database, the digest of the private database, and a digest of the private dataset, by transmitting the block to another block verification device.

5. A non-transitory computer readable storage medium storing a program that causes a computer to function as the block verification device according to claim 1.

6. A non-transitory computer readable storage medium storing a program that causes a computer to function as the block verification device according to claim 2.

* * * * *